US007784054B2

(12) United States Patent
Monasterio

(10) Patent No.: US 7,784,054 B2
(45) Date of Patent: Aug. 24, 2010

(54) SYSTEMS AND METHODS FOR CPU THROTTLING UTILIZING PROCESSES

(75) Inventor: Michael Monasterio, Brunswick, OH (US)

(73) Assignee: WM Software Inc., Brunswick, OH (US)

( * ) Notice: Subject to any disclaimer, the term of this patent is extended or adjusted under 35 U.S.C. 154(b) by 1180 days.

(21) Appl. No.: 10/824,303

(22) Filed: Apr. 14, 2004

(65) Prior Publication Data

US 2005/0235285 A1      Oct. 20, 2005

(51) Int. Cl.
 G06F 9/455    (2006.01)
 G06F 9/46     (2006.01)
 G06F 15/173   (2006.01)

(52) U.S. Cl. .............. 718/105; 718/1; 718/102; 718/104; 709/223; 709/224; 709/225; 709/226; 709/229

(58) Field of Classification Search ........ 718/1, 718/100, 101, 102, 103, 104, 105, 108; 709/220, 709/221, 222, 223, 224, 225, 226, 229, 231, 709/232, 233, 234, 235
See application file for complete search history.

(56) References Cited

U.S. PATENT DOCUMENTS

| 5,422,806 | A | * | 6/1995 | Chen et al. | 700/29 |
|---|---|---|---|---|---|
| 5,608,662 | A | * | 3/1997 | Large et al. | 708/300 |
| 5,623,647 | A | * | 4/1997 | Maitra | 713/501 |
| 5,748,958 | A | * | 5/1998 | Badovinatz et al. | 718/100 |
| 5,812,844 | A | * | 9/1998 | Jones et al. | 718/104 |
| 5,872,972 | A | * | 2/1999 | Boland et al. | 718/102 |
| 5,898,870 | A | * | 4/1999 | Okuda et al. | 718/104 |
| 6,067,557 | A | * | 5/2000 | Hegde | 718/103 |
| 6,098,122 | A | * | 8/2000 | Emmes et al. | 710/29 |
| 6,148,324 | A | * | 11/2000 | Ransom et al. | 718/105 |
| 6,269,391 | B1 | * | 7/2001 | Gillespie | 718/100 |
| 6,405,045 | B1 | * | 6/2002 | Choi et al. | 455/453 |
| 6,412,049 | B1 | * | 6/2002 | Baxter et al. | 711/158 |
| 6,442,583 | B1 | * | 8/2002 | Eilert et al. | 718/104 |
| 6,477,561 | B1 | * | 11/2002 | Robsman | 718/105 |
| 6,480,918 | B1 | * | 11/2002 | McKenney et al. | 710/200 |
| 6,498,460 | B1 | * | 12/2002 | Atkinson | 320/135 |
| 6,532,214 | B1 | * | 3/2003 | Rumsewicz | 370/236 |
| 6,542,920 | B1 | * | 4/2003 | Belkin et al. | 718/104 |

(Continued)

OTHER PUBLICATIONS

Abraham Silberschatz; Applied Operating System Concepts; First Edition 2000; John Wiley & Sons, Inc.; p. 91.*
Microsoft Computer Dictionary; Fifth Edition, 2002; Microsoft Corporation; p. 518.*

*Primary Examiner*—Meng-Ai An
*Assistant Examiner*—Abdullah Al Kawsar

(57) ABSTRACT

Systems and methods are disclosed that facilitate central processing unit (CPU) throttling utilizing processes to facilitate enhanced management of CPU resources and to mitigate system crashes. A process (or group thereof) that occupies CPU resources at a percentage greater than a selectable predetermined threshold percentage can be monitored, suspended for a variable time period, and resumed. The process can be monitored to determine whether suspension of the process successfully reduced the percentage of CPU resources occupied by the process. Feedback information can be generated to facilitate a determination regarding a most suitable increase or decrease to suspension time of the process in order to minimize the number of reiterations required to successfully throttle the process. The invention also provides for an Ignore functionality, via which a process (or group thereof) can be exempted from throttling based on an exemption of the process, group of processes, and/or user.

17 Claims, 12 Drawing Sheets

U.S. PATENT DOCUMENTS

| | | | |
|---|---|---|---|
| 6,581,104 B1 * | 6/2003 | Bereiter | 709/232 |
| 6,587,967 B1 * | 7/2003 | Bates et al. | 714/35 |
| 6,792,460 B2 * | 9/2004 | Oulu et al. | 709/224 |
| 6,845,456 B1 * | 1/2005 | Menezes et al. | 713/320 |
| 6,993,681 B2 * | 1/2006 | Haynes et al. | 714/23 |
| 7,058,824 B2 * | 6/2006 | Plante et al. | 713/300 |
| 7,353,366 B2 * | 4/2008 | Saitoh et al. | 712/220 |
| 2001/0044909 A1 * | 11/2001 | Oh et al. | 713/600 |
| 2002/0124197 A1 * | 9/2002 | Atkinson | 713/322 |
| 2002/0194509 A1 * | 12/2002 | Plante et al. | 713/300 |
| 2003/0028583 A1 * | 2/2003 | Flores et al. | 709/105 |
| 2003/0041145 A1 * | 2/2003 | Frederiksen | 709/225 |
| 2003/0088609 A1 * | 5/2003 | Guedalia et al. | 709/107 |
| 2003/0126184 A1 | 7/2003 | Austin | |
| 2003/0182376 A1 * | 9/2003 | Smith | 709/205 |
| 2003/0204762 A1 * | 10/2003 | Lee et al. | 713/322 |
| 2003/0217296 A1 * | 11/2003 | Ma | 713/300 |
| 2004/0042476 A1 * | 3/2004 | Peacock | 370/412 |
| 2005/0044319 A1 * | 2/2005 | Olukotun | 711/118 |
| 2005/0160424 A1 * | 7/2005 | Broussard et al. | 718/1 |

* cited by examiner

SYSTEMS AND METHODS FOR CPU THROTTLING UTILIZING PROCESSES

TECHNICAL FIELD

This invention is related generally to computers, and more particularly to systems and methods that facilitate central processing unit resource management.

BACKGROUND OF THE INVENTION

As computers become faster and more capable, applications and processes associated therewith are often designed with little regard for the capabilities of the computer on which they will ultimately run. A computer program released today may very well be installed and run tomorrow on a computer manufactured three years ago. As technology advances at an exponential rate, a state-of-the-art computer manufactured three years ago is obsolete by present day standards. Thus, modern applications often are subject to the limitations of a central processing unit (CPU) that was designed years ago, such that the modern application consumes most, if not all, of the CPU resources in order to run. When this occurs, other programs that require a response from the CPU can be ignored.

If a CPU does attempt to respond to other programs requesting attention, it must do so by stealing resources from still other programs or processes, which in turn, submit further requests from the CPU. For example, if a thread in process1 is occupying CPU resourceX and a thread in process2 is occupying resourceY, and then a thread in process1 requests resourceY from the CPU, the CPU cannot provide resourceY until the thread in process2 releases it. If a thread in process2 then requests resourceX, a thread deadlock condition occurs, wherein neither process will release the resource it possesses until it receives the requested resource, which it cannot receive until released by the other process. Such a condition is also known as "thrashing," and is typically perceived by a user as painfully slow, or even frozen, computer progress. As users demand more and more from computers, such processing delays can be terribly frustrating and can substantially diminish a user's computing experience.

In an age where nanoseconds count, conventional methods and systems that attempt to enhance CPU resource management can be unnecessarily time-consuming and superfluous, and, therefore, tedious and inefficient. Thus, there is an unmet need in the art for systems and methods that minimize the number of actions and/or amount of time required to efficiently manage CPU resources.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods that facilitate mitigating problems associated with central processing unit (CPU) resource demand. According to an aspect of the invention, a monitoring component can gather information regarding the percentage of CPU resources that are being used by system applications at a given time. A control component can analyze information received from the monitoring component to determine whether a given process's demands exceed a predetermined threshold of CPU resources. If it is determined that CPU usage is above the optimal threshold, then selected processes can be suspended and resumed, or "throttled," by the CPU in order to improve performance and mitigate potential system crashes. Furthermore, the duration of the suspension of the throttled process is variable, permitting real-time adaptation to changing demands on a given CPU. One advantage associated with suspension of an entire process, in contrast with suspension of a single thread (or fewer than all threads in a given process, etc.), is the mitigation of thread deadlock, which can lead to an application crash. According to this example, by suspending all the threads in a process simultaneously and/or by suspending the process while ignoring the threads therein, (e.g. without monitoring and/or evaluating individual threads, etc.), the duration of the suspension can be minimized, which, in turn, reduces the potential for an application to freeze. Additionally, process throttling can be selectively enabled by, for example an administrator/user such that certain user(s), process(es), objects comprising a plurality of processes, etc. can be selected for throttling. Furthermore, the threshold percentage at or above which a process is deemed delinquent can be selected by an administrator/user.

According to a related aspect of the present invention, feedback/feed-forward information can be generated to augment control of CPU resource allocation. Such feedback/feed-forward information can be analyzed by a control component to increase the efficiency with which the present invention can throttle a process that consumes a greater percentage of CPU resources than desired. Such feedback/feed-forward information can facilitate greater efficiency in determining a proper temporal variation of suspension of the process.

According to yet another aspect of the invention, a control component can provide an "Ignore" functionality, via which selected process(es) can be exempted from CPU throttling. For example, many gaming applications require a substantial majority of a CPU's resources in order to run at a maximum speed, efficiency, graphic quality, etc. Such applications' processes can therefore be subject to CPU throttling by the present invention. In order to mitigate potential interruption to the gaming experience of a user, the Ignore functionality permits the present invention to throttle any super-threshold processes except, for example, "game.exe." In this manner, the process(es) required to run the gaming application are not subject to throttling and can use as much of the CPU's resources as necessary to provide a richer experience to the user. Additionally, the Ignore functionality can be user-specific, based on file name, and/or can be applied to all files in a folder, etc.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to comprise all such aspects and their equivalents.

Other advantages and novel features of the invention may become apparent from the following detailed description of the invention when considered in conjunction with the drawings.

DETAILED DESCRIPTION OF THE INVENTION

Figure 1:
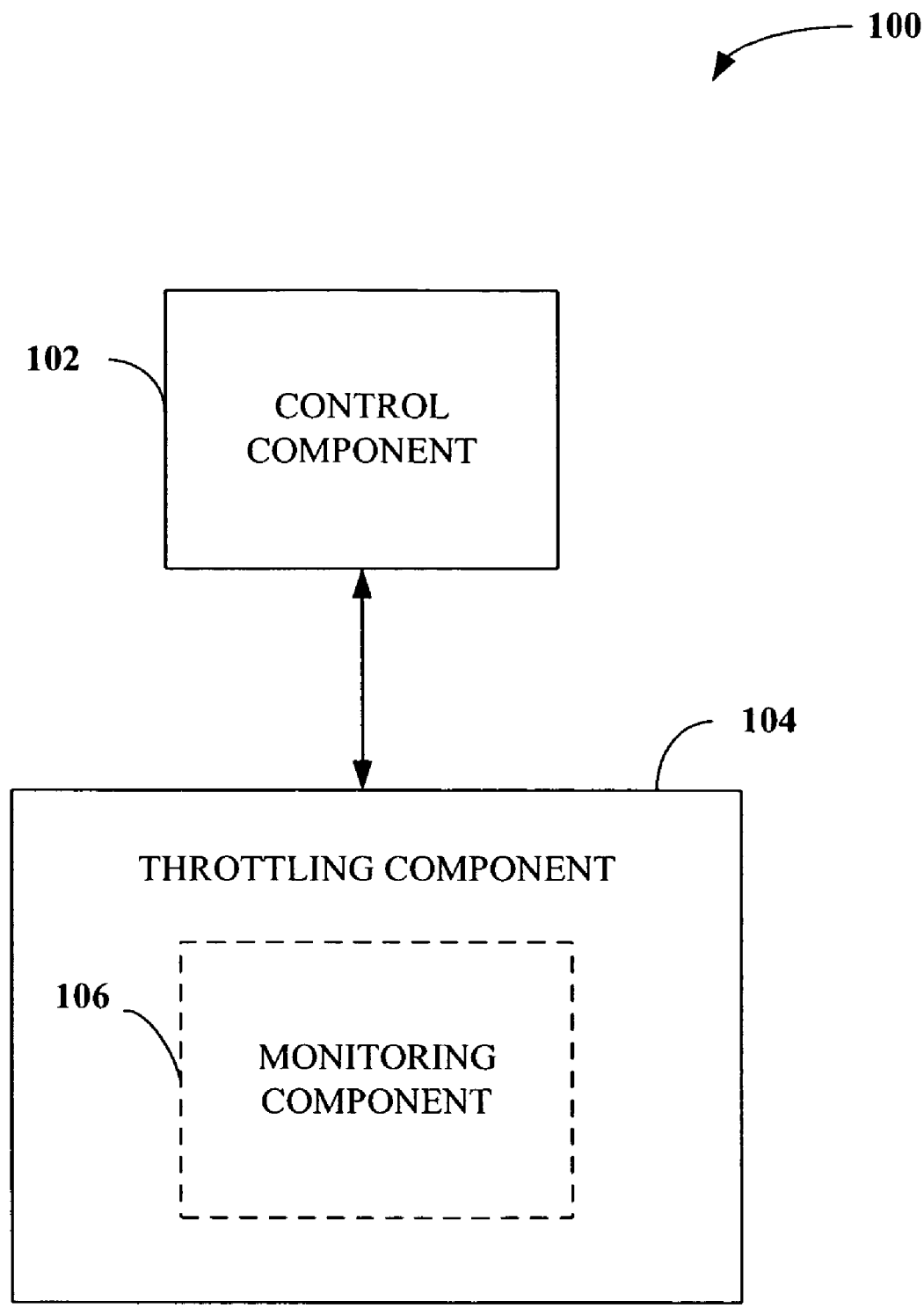
FIG. 1 is an illustration of a CPU throttling system that facilitates throttling of computer processes in accordance with an aspect of the invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

FIG. 1 is an illustration of a CPU throttling system 100 that facilitates selective CPU throttling of processes. A process is a running program on a computer and has associated with it a unique set of data that facilitates tracking of the process. Processes comprise threads, which can be thought of as packets of information that each are associated with a single particular use of a process, where multiple instances of a process can be utilized concurrently by a plurality of users.

The CPU throttling system 100 comprises a control component 102, which is operably coupled to a throttling component 104, which comprises a monitoring component 106. The monitoring component 106 can gather information regarding the degree to which a given process is occupying a CPU's resources. The control component 102 can receive such information from the monitoring component 106 and determine whether the percentage of the CPU's resources being consumed by the process is above a predetermined threshold, for example, 50%. If the control component 102 determines that the monitored process is occupying more than 50% of the CPU's resources, then the process is delinquent and the control component 102 can direct the throttling component 104 to suspend the entire process for a variable time period in order to permit access to competing processes to the CPU. The throttling component 104 can receive feedback information from the monitoring component 106 regarding the status of CPU resources and/or demand thereof, upon which information the throttling component 104 can base a decision regarding varying the duration of process suspension. For example, if a process is suspended for n nanoseconds before being resumed, and if after resuming the process, the monitoring component 106 indicates that the process is still dominating more than the desired threshold amount of CPU resources, then the throttling component 104 can repeat suspension of the process for a duration of n+1 nanoseconds. Such feedback loops are not limited in the number of iterations they can endure.

Additionally, if information gleaned by the monitoring component 106 indicates that a process has been successfully throttled (e.g., after resumption the process consumes less than 50% of CPU resources), but that the effect of the throttling does not last for a sufficient amount of time (e.g., x number of monitoring intervals, where x is an integer), then the throttling component 104 decrease the duration of process suspension in order to decrease the length of the interval to permit successful throttling to occur for a sufficient number of intervals, which in turn permits a determination to be made that monitoring of the delinquent process can be terminated. Decreasing the suspension period of the process mitigates the potential for a user to detect or notice that the process is being suspended, thus providing a more enhanced computing experience.

By suspending the entire delinquent process without regard for specific threads therein, this aspect of the invention effectively mitigates the potential for an occurrence of "thread deadlock," which can occur when two processes each request resources that are occupied by the other. Conventional systems that ineffectively sacrifice time to determine delinquency of specific threads in a delinquent process can actually cause thread deadlock, which can in turn cause a system crash. For example, if a thread in process1 is occupying CPU resourceX and a thread in process2 is occupying resourceY, and then a thread in process1 requests resourceY from the CPU, the CPU cannot provide resourceY until the thread in process2 releases it. If a thread in process2 then requests resourceX, a thread deadlock condition occurs, wherein neither process will release the resource it possesses until it receives the requested resource, which it cannot receive until released by the other process. Such an impasse can be mitigated by throttling the entire delinquent process, which in turn liberates CPU resources for queued processes requesting them. It is to be appreciated that the present invention can be employed on a Windows server, a terminal server, a non-terminal server, a PC, a laptop, a handheld device such as a PDA, etc., or any other suitable computing architecture, without being limited thereto. It is further to be appreciated that the systems and methods described herein can be employed to throttle entire process(es) in a manner that facilitates throttling of the process as a whole and/or concurrent throttling of every thread in the process, depending on the specific operating environment in which the subject systems and methods are employed.

Figure 2:
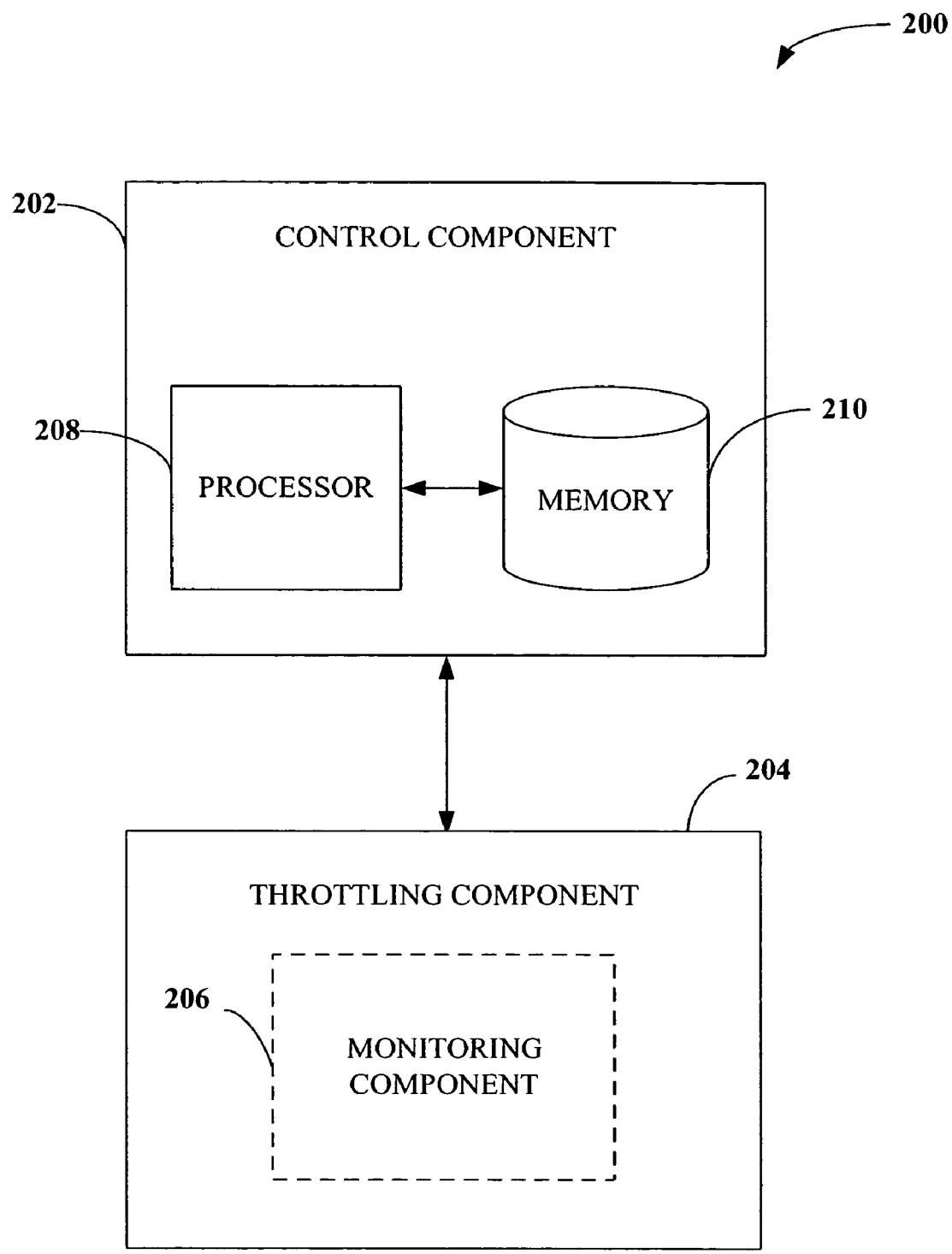
FIG. 2 is an illustration of a CPU throttling system in accordance with an aspect of the invention.

FIG. 2 is an illustration of a CPU throttling system 200 that facilitates suspending and resuming processes that dominate CPU resources. A control component 202 is operably coupled to a throttling component 204 that comprises a monitoring component 206. The control component 202 is further operatively associated with a processor 208 and a memory 210. The processor 208 can analyze information received from the throttling component 204 and/or the monitoring component 206. The memory 210 can store information associated with, for example, status of the CPU, status of CPU resources, process requests, suspended process state(s), etc. It is to be understood that a that the processor 208 can be a processor dedicated to determining whether a process requires throttling, a processor used to control one or more of the components of the present system(s), or, alternatively, a processor that is used to determine whether a process requires throttling and to control one or more of the components of the CPU throttling system.

The memory component 210 can be employed to retain control programs, CPU status information, etc. Furthermore, the memory 210 can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 210 of the present systems and methods is intended to comprise, without being limited to, these and any other suitable types of memory.

Figure 3:
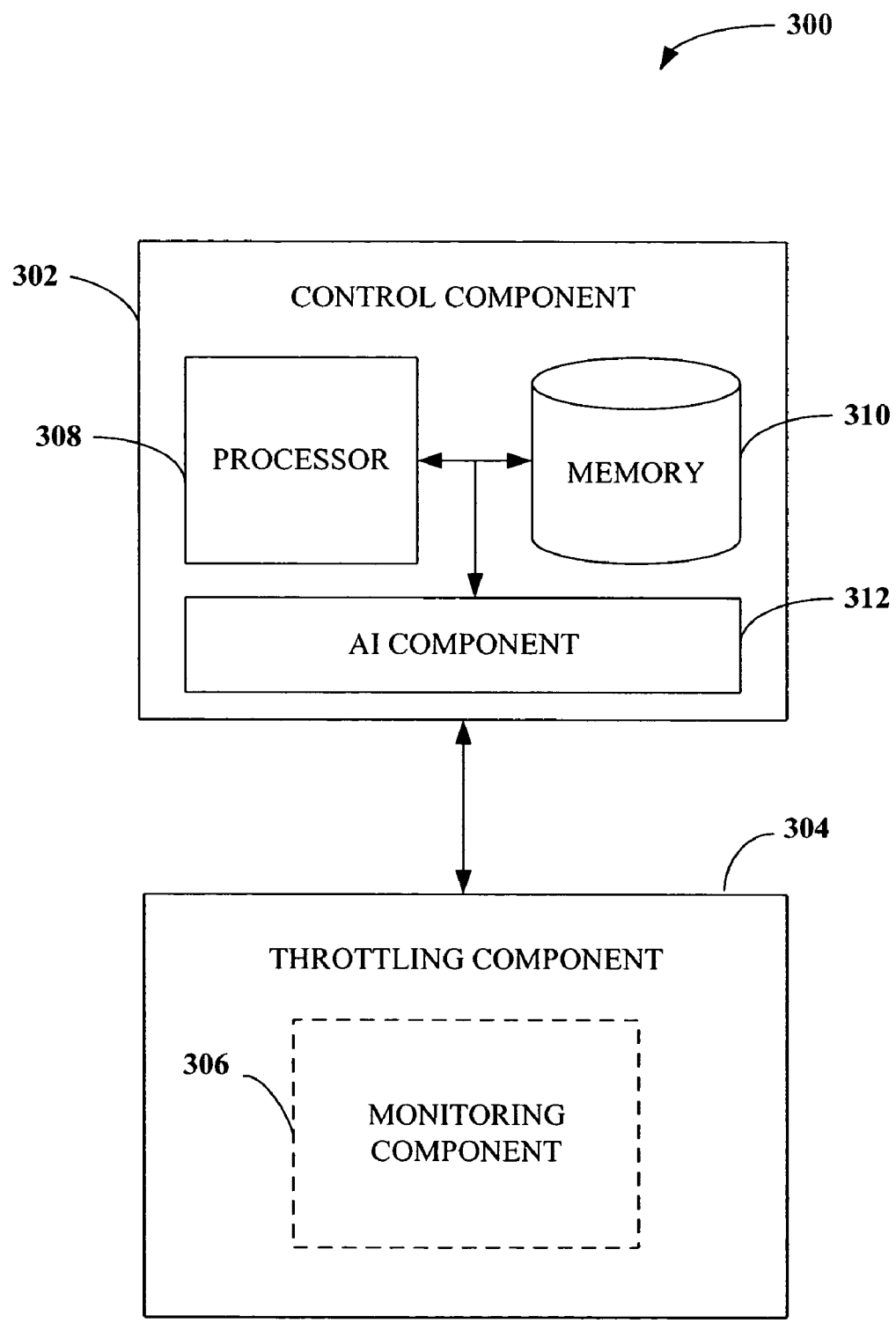
FIG. 3 is an illustration of a CPU throttling system in accordance with an aspect of the invention.

Now referring to FIG. 3, artificial intelligence (AI) based systems (e.g., explicitly and/or implicitly trained classifiers) can be employed in connection with performing inference and/or probabilistic determinations and/or statistical-based determinations as described herein. The present invention can employ various inference schemes and/or techniques in connection with the present invention. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, . . . ) can be employed in connection with performing automatic and/or inferred action in connection with the subject invention.

FIG. 3 is an illustration of a CPU throttling system 300 in accordance with an aspect of the present invention. A control component 302 is operably coupled to a throttling component 304 that in turn is operatively associated with a monitoring component 306. The control component 302 is further operatively associated with a processor 308, a memory 310, and an AI component 312. By way of example, the control component 302 can comprise the processor 308, the memory 310, and the AI component 312, although alternative configurations are contemplated by the present invention. The AI component 312 can make inferences regarding, for example, whether a process requires throttling, whether CPU resource usage is above a critical threshold, whether a given process should be ignored despite a greater-than-threshold usage of the CPU, etc. These examples are given by way of illustration only and are not intended to limit the scope of the present invention or the number of, or manner in which the AI component makes, inferences. Additionally, it is to be appreciated that the AI component 312 and AI techniques employed thereby can be operatively associated with the throttling component 304, in addition to, or as an alternative to, being associated with the control component 302.

While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 4:
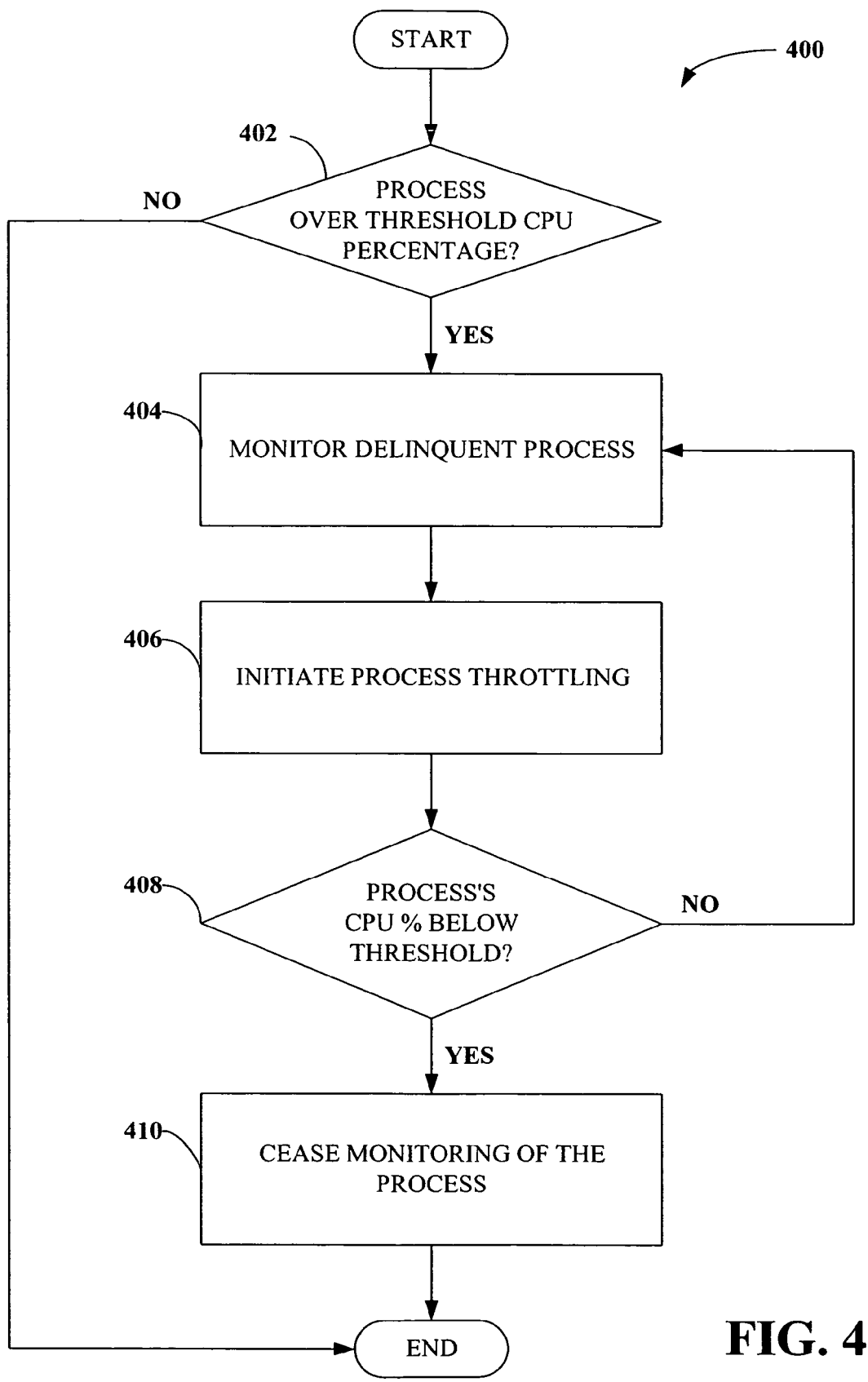
FIG. 4 is an illustration of a methodology that facilitates CPU throttling of processes in accordance with an aspect of the invention.

FIG. 4 is an illustration of a methodology 400 for CPU throttling of processes in accordance with an aspect of the present invention. At 402, a determination is made regarding whether a given process is occupying more than a threshold percentage of CPU resources. If the process is determined to be below the critical threshold CPU percentage value, then no further action is necessary. However, if it is determined that the process is delinquent (e.g., is consuming more than the threshold percentage of CPU resources), then the method can proceed to 404, where the delinquent process is monitored. At 406, suspend/resume protocols can be initiated to throttle the offending process. Then, at 408, a determination can be made regarding whether CPU throttling of the process was sufficient to reduce the percentage of CPU occupied by the process to a percentage below the threshold percentage. If it is determined that throttling was not sufficient to bring the delinquent process under control, then the method can revert to 404 for continued monitoring of the process and further iteration of throttling protocols. If it is determined that CPU throttling of the processes was sufficient to bring the process under control, then at 410, monitoring of the process can be terminated.

According to an aspect of the invention, advanced settings can be provided to and/or customized by, for example, a user, an administrator, etc. In accordance with this example, an administrator can select a rate at which a process is brought down to threshold (e.g., throttle process within 1 second, 10 seconds, etc.), depending on system demands. Additionally, an administrator can select a process or group thereof to be "Ignored" for a set period of time (e.g., 5 minutes, 3 hours etc.) According to a related example, an administrator can exempt process(es), specific users, etc., from CPU throttling. For example, a specific user on a system can be exempted from throttling so that any process(es) utilized by that specific user is exempt from throttling, no matter what the process is. Similarly, the Administrator can determine which process(es), users, etc. will be included in a group thereof to be throttled. Furthermore, all processes in a given folder can be included/exempted from CPU throttling in accordance with an administrator's desires.

According to a related aspect of the invention, custom attributes can be provided and/or selected for specific process(es). For example, a user/administrator can set throttling threshold(s) for specific process(es). To further this example, an administrator can set a word processing process to be throttled if it consumes greater than 50% of CPU resources, while setting a spreadsheet process to be throttled if its CPU consumption exceeds a 75% threshold. Threshold percentages presented in connection with this and other aspects of the invention are not limited to the exemplary percentages provided, but rather can be any percentage between 0% and 100%.

Figure 5:
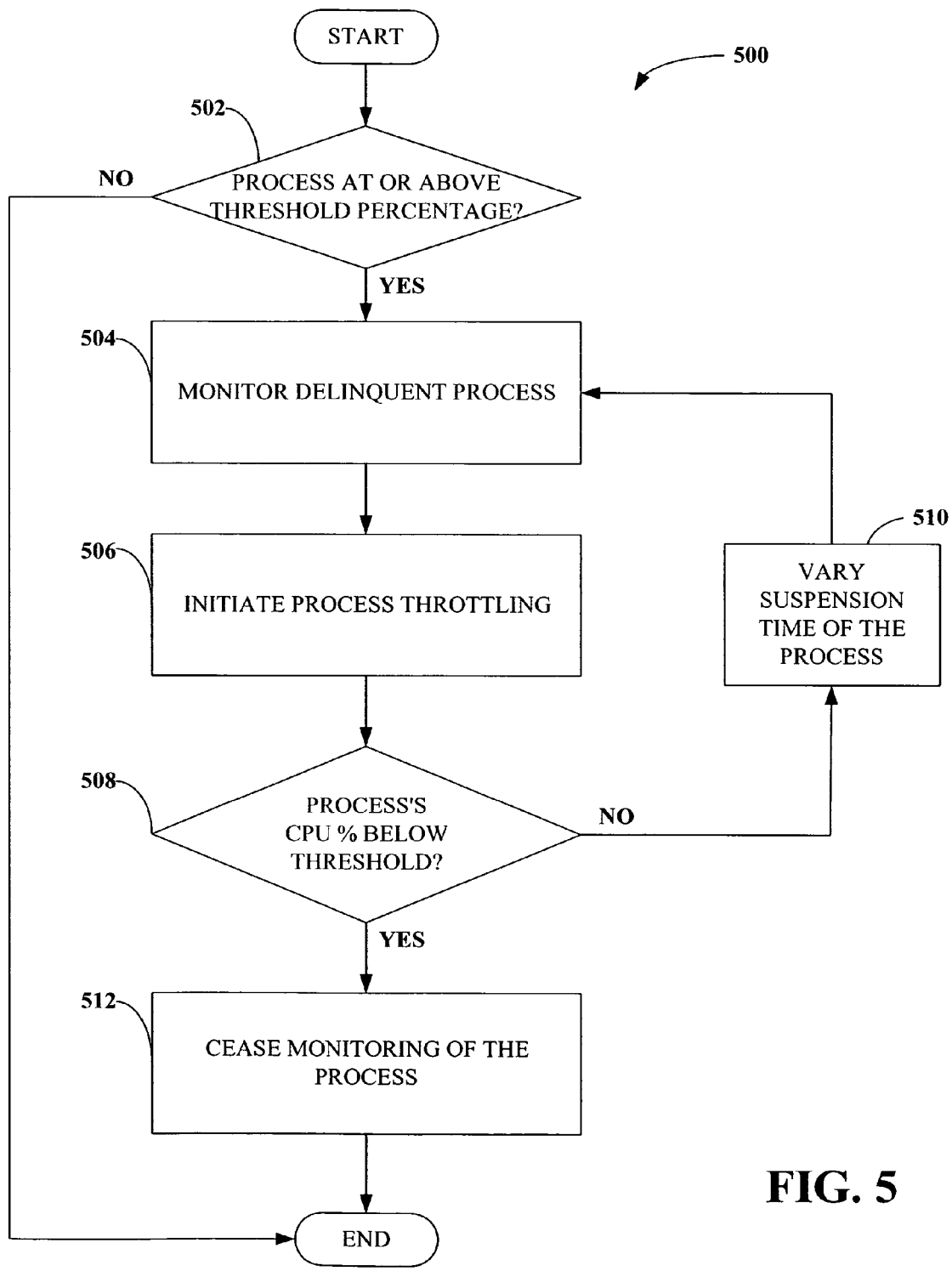
FIG. 5 is an illustration of a methodology that facilitates CPU throttling of processes in accordance with an aspect of the invention.

FIG. 5 is an illustration of a methodology 500 in accordance with an aspect of the present invention. At 502, a determination is made regarding whether a suspect process is occupying a percentage of CPU resources above a predetermined desirable threshold percentage. If the suspect process is below the threshold percentage, then no further action need be taken. If the process is at or above the desired threshold percentage, then it is delinquent and monitoring of the delinquent process begins at 504. At 506, suspend/resume actions can be initiated to throttle the offensive process. Throttling of the offensive process can occur without regard to the particular thread(s) responsible for over-occupation of CPU resources (e.g., the system need not evaluate individual threads to determine which specific thread(s) are delinquent, etc.). In this manner, the present invention can reduce the time requirement for suspend/resume actions taken on the delinquent process, thus providing for a more seamless transition period during throttling of the process. Such mitigation of throttling delay permits a more deeply enriched experience for an end-user and facilitates avoidance of potential occurrences of thread deadlock.

At 508, a determination can be made as to whether the offending process has been brought under control (e.g., whether the process occupies less than a threshold percentage of CPU resources, etc.). If the delinquent process was not sufficiently throttled to reduce the percentage of CPU occupied by the delinquent process to a percentage below the threshold percentage, the method can proceed to 510, where the suspension time of the offending process can be varied to more precisely control access of the delinquent process to CPU resources. Upon adjustment of the duration of the suspend protocol, the method can revert to 504, for continued monitoring of the delinquent process and another iteration of process throttling. In this manner, the methodology 500 can employ feedback information to enhance control of CPU resources and provide a more meaningful computing experience to an end-user.

Figure 6:
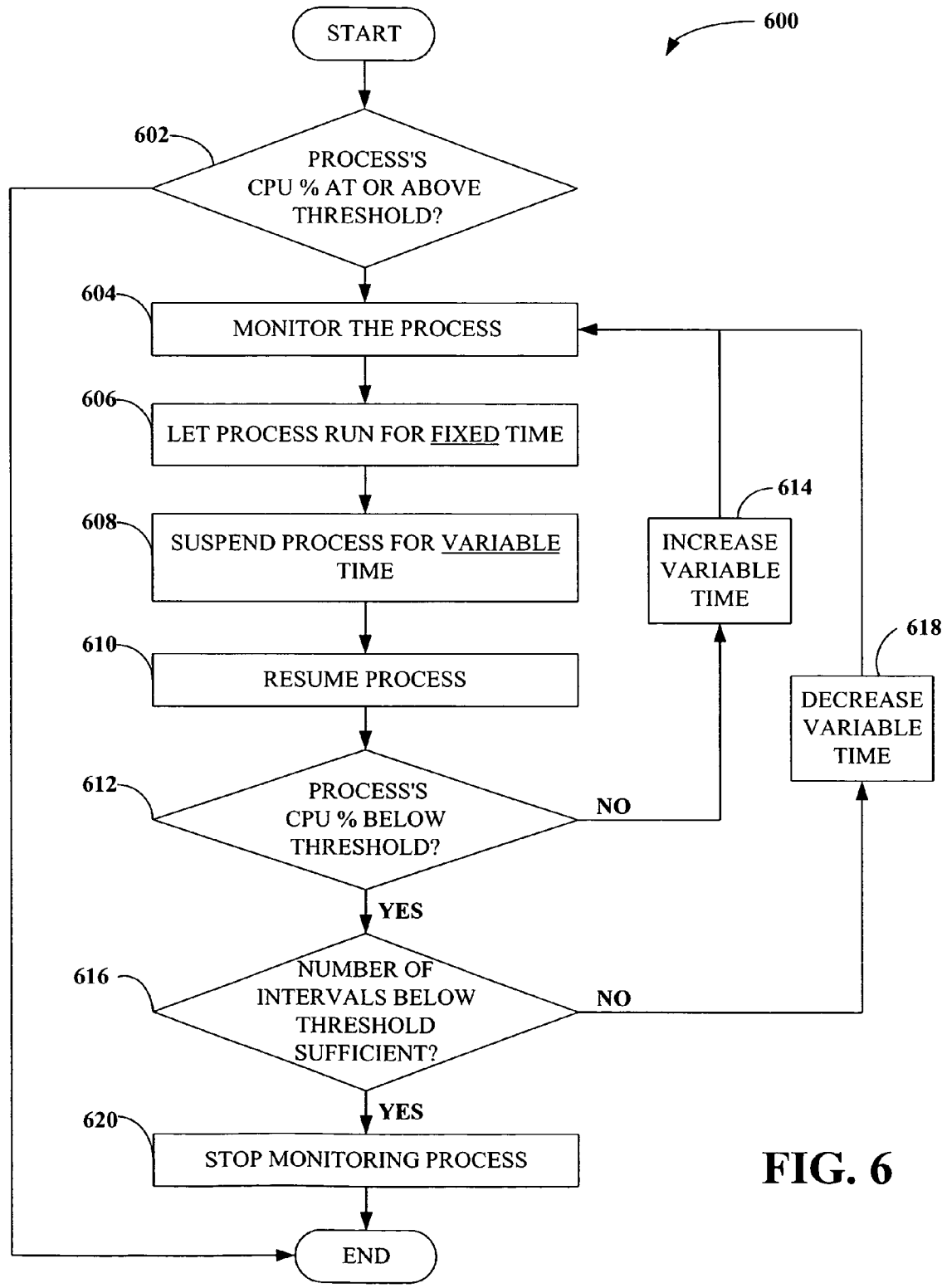
FIG. 6 is an illustration of a methodology that facilitates CPU throttling of processes in accordance with an aspect of the invention.

FIG. 6 is an illustration of a methodology 600 for CPU throttling of processes in accordance with an aspect of the present invention. At 602, a determination is made regarding whether a given process is using more than a threshold percentage of CPU resources. The threshold percentage can be, for example, 50%, but can be 5%, 10%, or any other suitable percentage of CPU resources between and including 0% and 100%. If the process is occupying more than the threshold percentage of CPU resources, then the process will be monitored beginning at 604. At 606, the monitored process is permitted to run for a fixed length of time. Then, the process is suspended for a variable length of time at 608. The suspension of the entire process can occur without requiring a determination of the thread responsible for over-threshold usage of the CPU, thus saving time and resources, which facilitate minimizing the duration of process suspension required to alleviate the problem while avoiding thread deadlock. At 610, the entire process is resumed. A determination is made at 612 regarding whether the process has been brought under control (e.g., whether the process occupies less than a threshold percentage of CPU resources, etc.). If the delinquent process was not sufficiently throttled to reduce the percentage of CPU occupied by the delinquent process to a percentage below the threshold percentage, then the method can proceed to 614, where the variable length of time for process suspension is increased. Increasing the variable suspension period provides greater access to CPU resources for other processes and facilitates avoidance of potential occurrences of thread deadlock. After adjusting the variable duration of process suspension at 614, the method can revert to 604 to reattempt CPU throttling of the delinquent process.

If, at 612, it is determined that CPU throttling of the process was successful, then at 616 a determination is made regarding whether the process has been successfully throttled for a minimum number of monitoring intervals (e.g., whether the process remains below the critical CPU threshold percentage for a sufficient amount of time to warrant cessation of process monitoring). If the process remains below threshold for the critical minimum number of intervals, then process monitoring can be halted at 620. If the process does not remain below the critical threshold for a sufficient length of time to warrant discontinuation of process monitoring, then the variable duration of process suspension can be decreased at 618. Decreasing the variable length of time for process suspension reduces the possibility that suspension of the process will create a delay that is noticeable to a user. The method can then revert to 604 for another iteration of process throttling.

Figure 7:
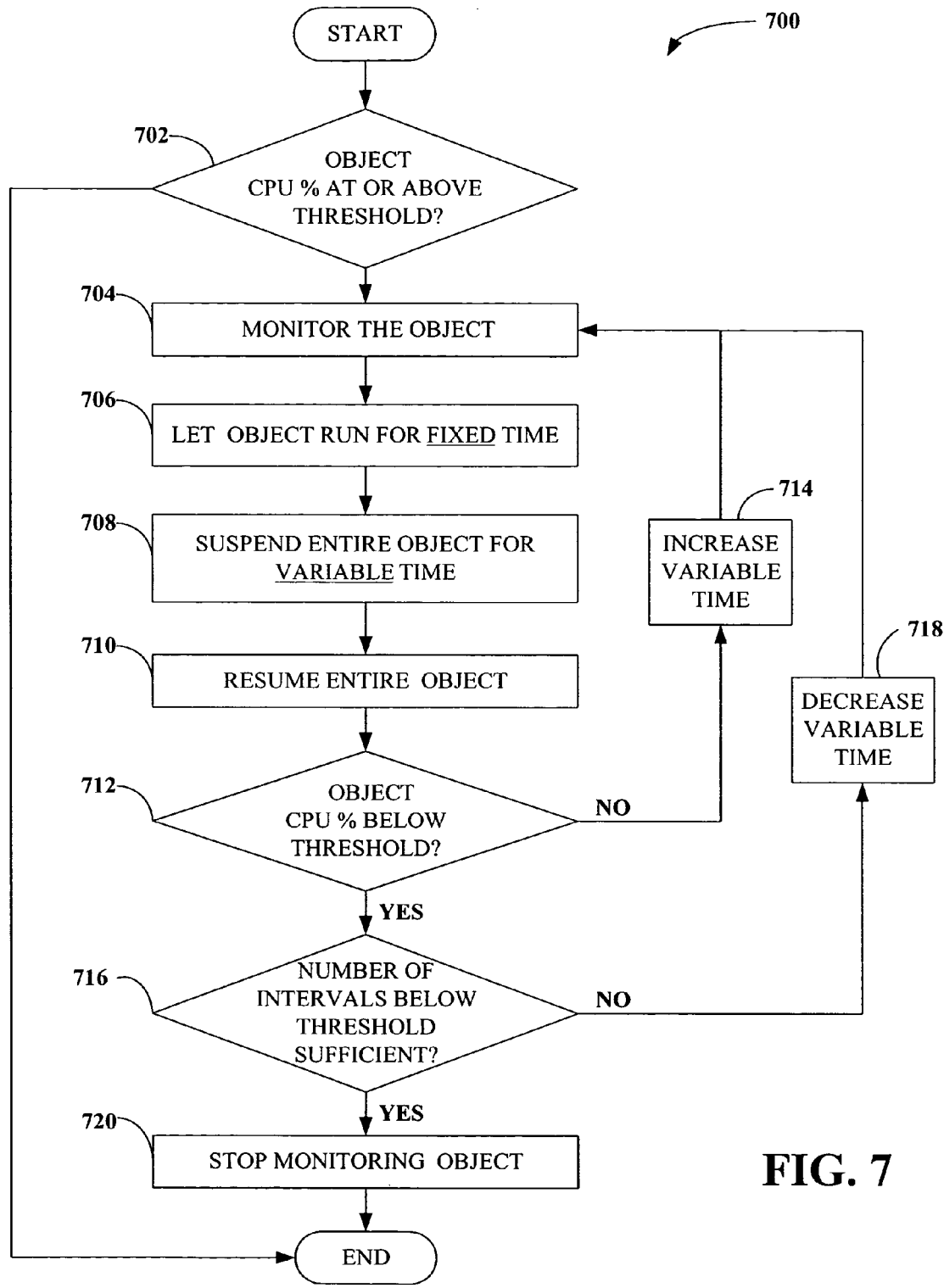
FIG. 7 is an illustration of a methodology that facilitates CPU throttling of process groups in accordance with an aspect of the invention.

FIG. 7 is an illustration of a methodology 700 for CPU throttling of an object, which can comprise a plurality of processes, process group(s), process tree(s), etc., in accordance with an aspect of the present invention. A process group is a plurality of processes in, for example, a single folder, application, etc., which can be independent of each other although related, or "grouped." A process tree is a plurality of processes that are related in a dependent manner, for example, parent and child processes, where a parent process can have an ability to created a child process, etc. At 702, a determination is made regarding whether a given object is using more than a threshold percentage of CPU resources. The threshold percentage can be, for example, 50%. It is to be appreciated, however, that the threshold percentage of CPU resources can be any percentage between 0% and 100%. For example, threshold percentage can be set to 5%, 10%, etc., but is not limited thereto. If the object is occupying more than the threshold percentage of CPU resources, then the object will be monitored beginning at 704. At 706, the monitored object can be permitted to run for a fixed length of time. Then, all processes in the object are suspended for a variable length of time at 708. The suspension of the entire object can occur without requiring a determination of the specific thread(s) responsible for over-threshold usage of the CPU, thus saving time and resources, which facilitates minimizing the duration of object suspension required to alleviate the problem and avoidance of a potential thread-deadlock episode. At 710, the entire object is resumed (e.g., every process in the object is resumed). A determination can be made at 712 regarding whether the object has been brought under control (e.g., the object occupies less than a threshold percentage of CPU resources, etc.). If the delinquent object was not sufficiently throttled to reduce the percentage of CPU occupied by the delinquent object to a percentage below the threshold percentage, then the method can proceed to 714, where the variable length of time for object suspension can be increased. Increasing the variable suspension period provides greater access to CPU resources for other processes and/or objects. After adjusting the variable duration of process suspension at 714, the method can revert to 704 to reattempt CPU throttling of the delinquent object.

If, at 712, it is determined that CPU throttling of the object (or process tree, etc.) was sufficient to bring the object within a desired percentage of CPU occupation, then at 717 a determination is made regarding whether the object remained within the desired percentage of CPU resource occupation for a minimum number of monitoring intervals (e.g., whether the object remains below the critical CPU threshold percentage for a sufficient amount of time to warrant cessation of object monitoring). If the object remains below threshold for the critical minimum number of intervals, then object monitoring can be halted at 720. If the process object does not remain below the critical threshold for a sufficient length of time to warrant discontinuation of object monitoring, then the variable duration of object suspension can be decreased at 718. Decreasing the variable length of time for object suspension reduces the possibility that suspension of the object will create a delay that is noticeable to a user. The method can then revert to 704 for another iteration of object throttling.

Figure 8:
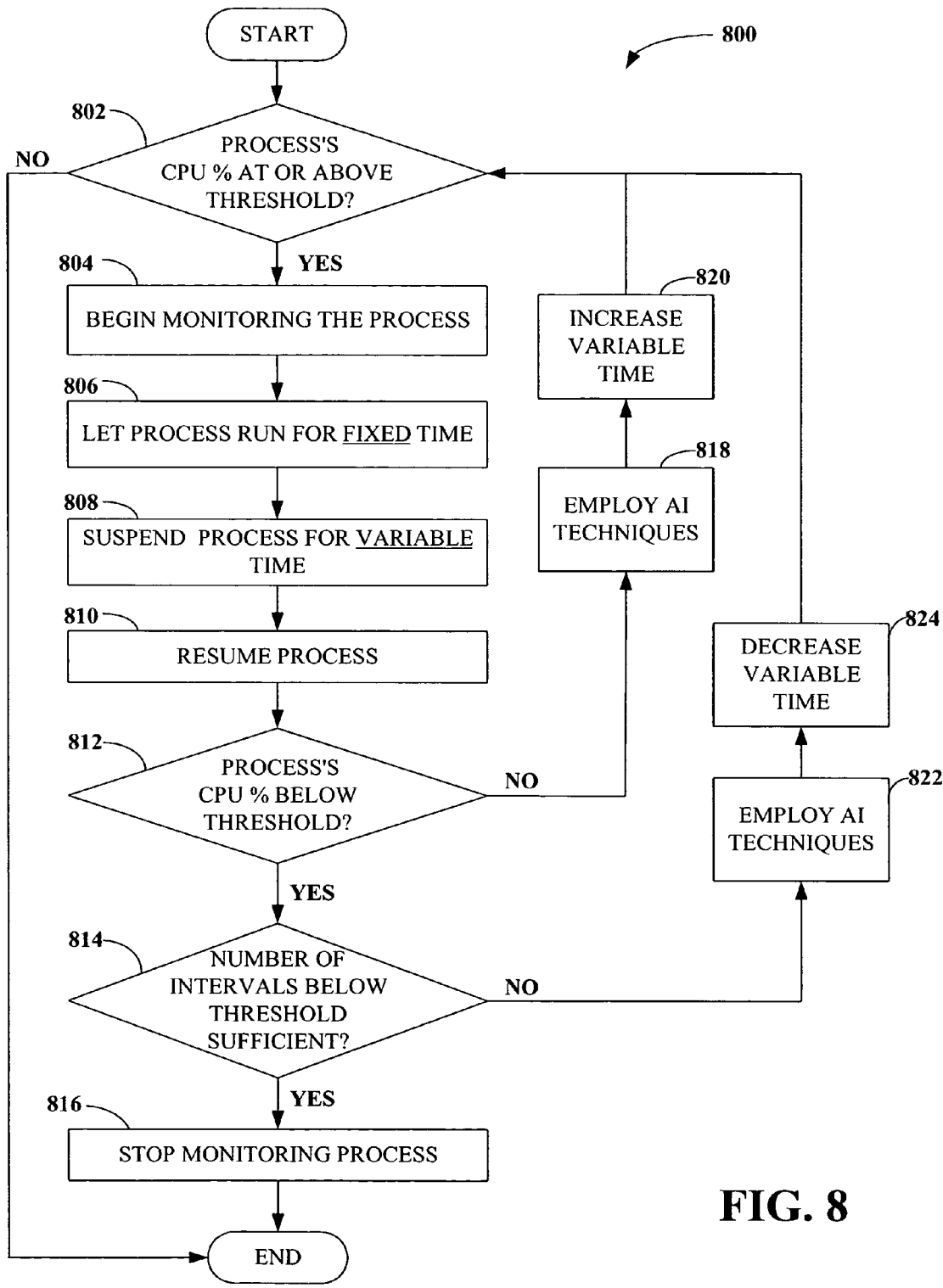
FIG. 8 is an illustration of a methodology that facilitates CPU throttling of processes in accordance with an aspect of the invention.

FIG. 8 is an illustration of a methodology 800 in accordance with an aspect of the present invention in which artificial intelligence can be employed to make inferences that facilitate enhanced performance of the CPU throttling methodology. At 802, a determination is made regarding whether a process is consuming more than a desired threshold percentage of CPU resources. If not, then no further action is taken. If the process is delinquent, then at 804 monitoring of the process is initiated. At 806, the process is permitted to run for a fixed time. Then, at 808, the entire process (e.g., every thread in the process, regardless of which individual thread is responsible for the delinquency of the process) is suspended for a variable time. At 810, the entire process is resumed. A determination of whether the process is occupying CPU resources at a percentage below threshold (e.g., whether throttling was successful) is made at 812. If the process is brought under control (e.g., the process occupies less than a threshold percentage of CPU resources, etc.). If the delinquent process was not sufficiently throttled to reduce the percentage of CPU occupied by the delinquent process to a percentage below the threshold percentage, then at 814 a determination of whether the process remains below the threshold percentage for a sufficient number of intervals is made. If the process remains below the threshold percentage for a sufficient number of intervals (e.g., 10 1-second intervals, etc.), then process monitoring can be terminated at 816.

If, at 812, it is determined that the process is still delinquent (e.g., the process is consuming more than a threshold percentage of CPU resources), then AI techniques can be employed at 818 to facilitate making inferences regarding enhancing performance of the methodology. For example, at 818, AI techniques can be employed to determine a proper increase to the variable time period during which the delinquent process is suspended. Then, at 820, the increase to the variable suspension period can be implemented and the method can revert to 802 for reiteration. Similarly, if the determination at 814 indicates that the process was successfully throttled but for an insufficient number of intervals, then at 822 AI techniques can be employed to infer, for example, a proper temporal decrease to the variable suspension period. Then, at 824, the decrease can be implemented and the methodology can return to 802 for further iteration. Thus, the methodology 800 can throttle a process in a manner that reduces potential for a detrimental thread-deadlock occurrence.

To further the above examples, feedback/feed-forward information can be generated and utilized to facilitate inferences regarding a proper variation of suspension time based on, for instance, a detected magnitude of percentage reduction of CPU resource usage. For example, if the critical threshold is set at 10% of CPU resources, a given process that is occupying 14% of CPU resources will be determined to be delinquent. If, after throttling of the delinquent process, it is determined that the process is still using 11% of CPU resources (e.g., as determined at 812), then an inference can be made that doubling the duration of process suspension will reduce the delinquent process's CPU consumption to 8%. It is to be understood that the algorithms describing relationships between duration of process suspension and CPU usage reduction are not limited to being linear, but can be exponential, geometric, etc. It is further to be appreciated that the threshold percentage above which a process is deemed delinquent can be any percentage between and/or inclusive of 0% and 100%, and is not limited to the 10% proffered in the foregoing examples.

Figure 9:
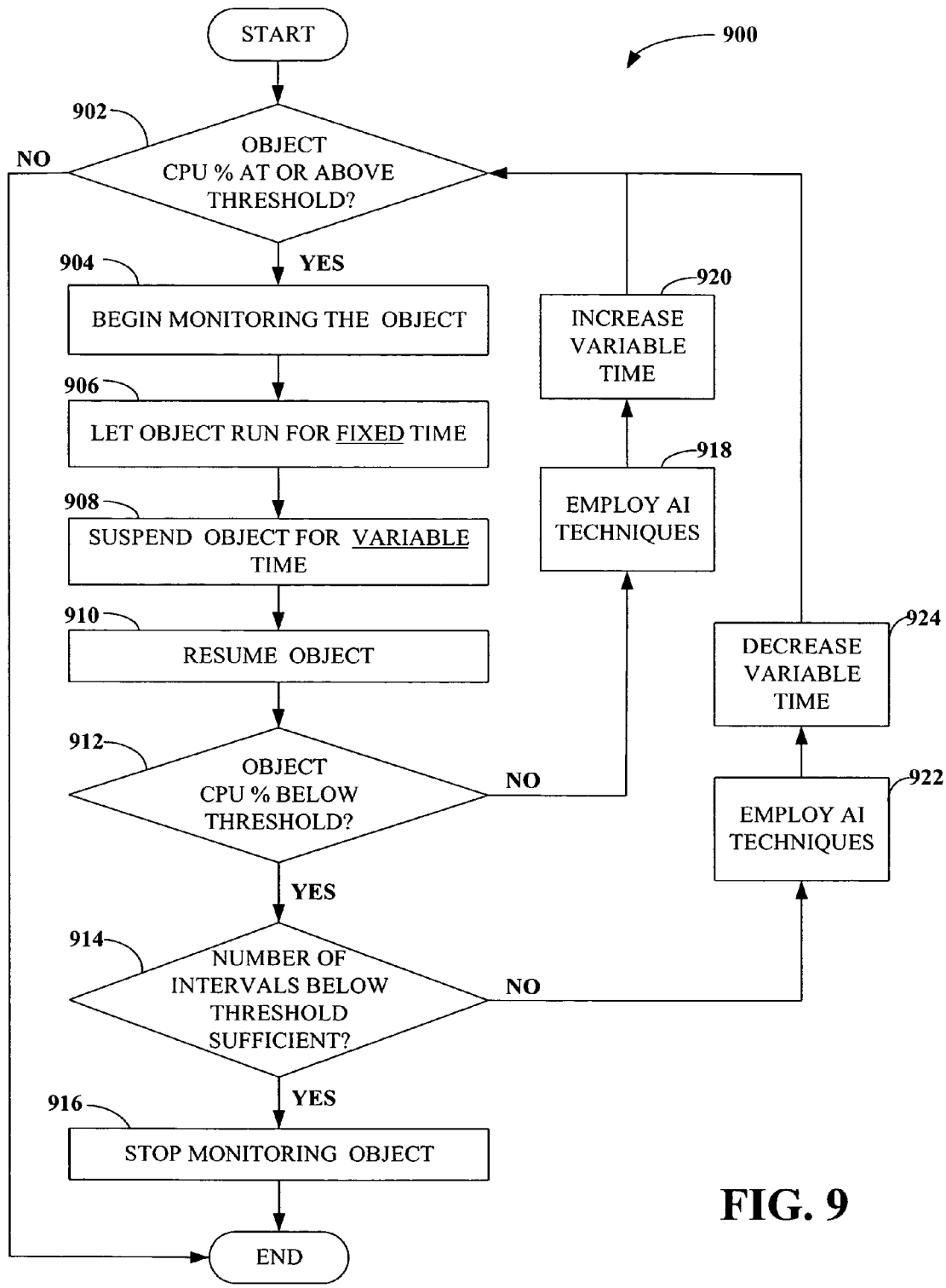
FIG. 9 is an illustration of a methodology that facilitates CPU throttling of process groups in accordance with an aspect of the invention.

FIG. 9 is an illustration of a methodology 900 in accordance with an aspect of the present invention in which artificial intelligence can be employed to make inferences that facilitate enhanced performance of the CPU throttling methodology when dealing with a plurality of processes, or objects. At 902, a determination is made regarding whether a plurality of processes (e.g., an object, etc.) is consuming more than a desired threshold percentage of CPU resources. If not, then no further action is taken. If the object is delinquent, then at 904 monitoring of the object is initiated. At 906, the object is permitted to run for a fixed time. Then, at 908, the entire object (e.g., every process in the object) is suspended for a variable time. At 910, the entire object is resumed. A determination of whether the object is occupying CPU resources at a percentage below threshold (e.g., whether throttling was successful) is made at 912. If the object was successfully throttled, then at 914 a determination of whether the object remains below the threshold percentage for a sufficient number of intervals is made. If the object remains below the threshold percentage for a sufficient number of intervals (e.g., 10 1-second intervals, etc.), then object monitoring can be terminated at 916.

If, at 912, it is determined that the object is still delinquent (e.g., the object is consuming more than a threshold percentage of CPU resources), then AI techniques can be employed at 919 to facilitate making inferences regarding enhancing performance of the methodology. For example, at 919, AI techniques can be employed to determine a proper increase to the variable time period during which the delinquent object is suspended. Then, at 920, the increase to the variable suspension period can be implemented and the method can revert to 902 for reiteration. Similarly, if the determination at 914 indicates that the object was successfully throttled but for an insufficient number of intervals, then at 922 AI techniques can be employed to infer, for example, a proper temporal decrease to the variable suspension period. Then, at 924, the decrease can be implemented and the methodology can return to 902 for further iteration.

To further the above examples, feedback/feed-forward information can be generated and utilized to facilitate inferences regarding a proper variation of suspension time based on, for instance, a detected magnitude of percentage reduction of CPU resource usage. For example, the critical threshold is set at 50% of CPU resources, a given object that is occupying 60% of CPU resources will be determined to be delinquent. If, after throttling of the delinquent object, it is determined that the object is still using 54% of CPU resources (e.g., as determined at 912), then an inference can be made that doubling the duration of object suspension will reduce the delinquent object's CPU consumption to 48%. It is to be understood that the algorithms describing relationships between duration of object suspension and CPU usage reduction are not limited to being linear, but can be exponential, geometric, etc. It is further to be appreciated that the threshold percentage above which a object is deemed delinquent can be, for example, 5%, 10%, and/or any percentage between and/or inclusive of 0% and 100%, and is not limited to the percentages proffered in the foregoing examples.

Figure 10:
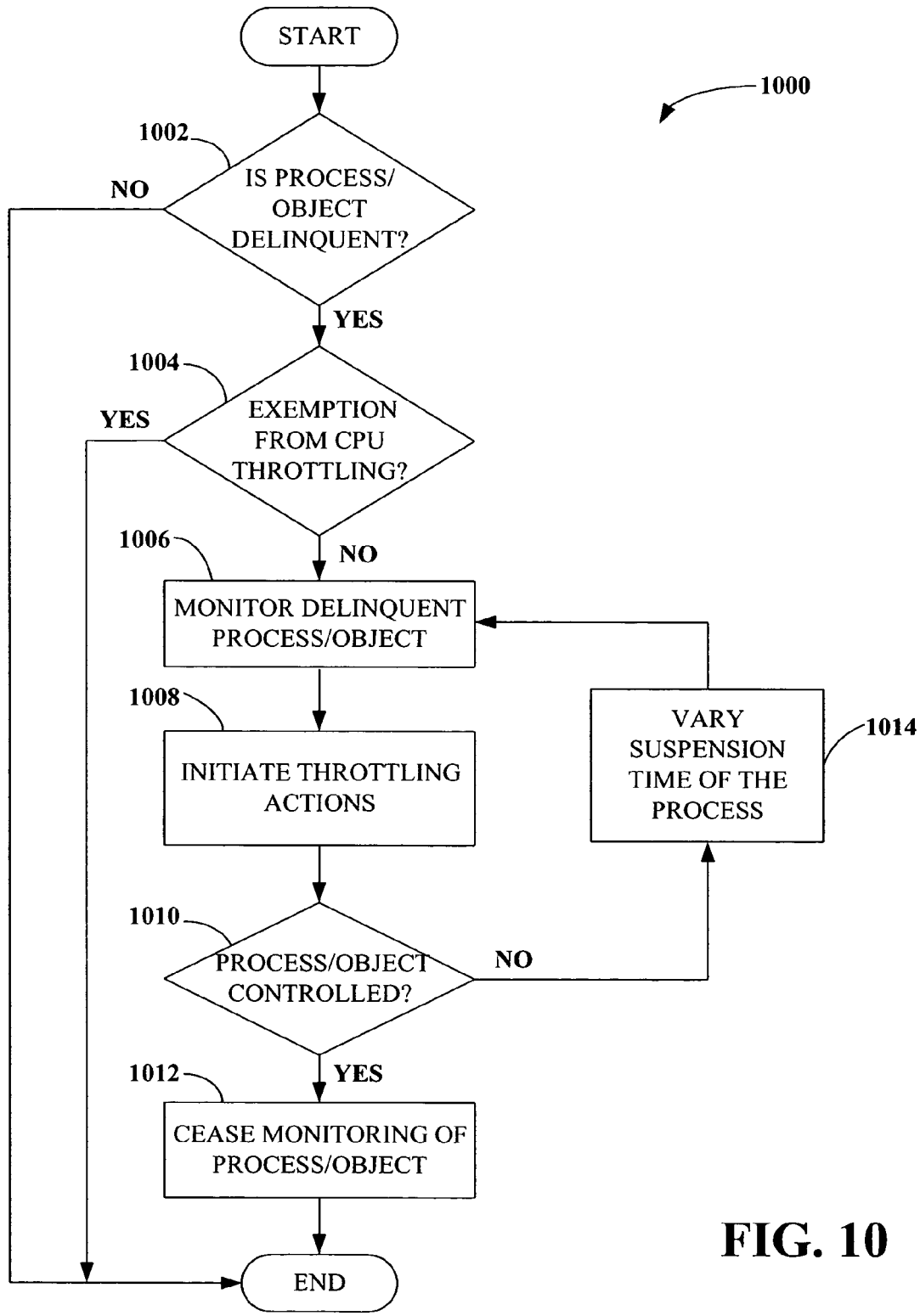
FIG. 10 is an illustration of a methodology that facilitates CPU throttling of processes while permitting Ignore functionality in accordance with an aspect of the invention.

FIG. 10 is an illustration of a methodology 1000 in accordance with an aspect of the present invention, according to which, a given process and/or object can be exempt from CPU throttling via an Ignore protocol. For example, a user who desires to maximize performance of an application (e.g., a gaming application) can select to ignore that gaming application when throttling. In this manner, the gaming application can be exempted from CPU throttling to provide a richer gaming experience. Additionally, a specific user, folder (e.g., containing related processes, etc.), etc., can be exempted from throttling (e.g., subject to an Ignore protocol).

According to the methodology 1000, a determination of whether a given process and/or object is delinquent is made at 1002. If the process and/or object is not delinquent, then no further action need be taken. If the process and/or object is determined to be delinquent (e.g., the process and/or object is consuming more than a threshold percentage of CPU resources, for example more that 50%), then at 1004, a determination is made regarding whether an exemption from throttling exists (e.g., process(es) and/or object(s) are subject to an Ignore protocol based on process exemption, object exemption, user exemption, etc.). If the culpable process and/or object is exempt, then no further action need be taken. If the process and/or object is not exempt from CPU throttling, then at 1006 process and/or object monitoring can be initiated. At 1008 the process and/or object is subjected to throttling actions, as discussed above. At 1010, a determination of whether the process and/or object has been brought under control (e.g., whether the process and/or object occupies less than a threshold percentage of CPU resources, etc.). If, at 1010, it is determined that the process and/or object has been brought under control, then the method can proceed to 1012, where monitoring of the process and/or object can be terminated. If the determination at 1010 indicates that the process and/or object has not been brought under control (e.g., the process and/or object is still consuming more than the desired threshold percentage of CPU resources), then at 1014 the duration of suspension time of the process and/or object can be adjusted, and the method can revert to 1006 for further monitoring and throttling iterations.

By returning to 1006 after adjusting the suspension period at 1014, the present methodology allows for an occurrence wherein a process and/or object is initially not exempt from throttling, but is subjected to an Ignore command during the execution of the methodology. For example, a user who is utilizing a gaming application but has forgotten to exempt the gaming application from CPU throttling can experience a potential slow-down in the gaming application during throttling. When the user remembers to issue an Ignore command regarding the gaming application, such command could potentially be missed if the method merely adjusted suspension time and then immediately initiated another throttling protocol. However, the methodology 1000 provides for adjusting the suspension period and then returning to 1006 for monitoring, which in turn permits a subsequent determination of the process's and/or object's exemption status. In this manner an Ignore command can be issued and successfully carried out at any time during performance of the methodology 1000. Furthermore, it is to be appreciated that the throttling exemption described in reference to FIG. 10 can be employed in conjunction with any of the various methodologies presented herein.

Figure 11:
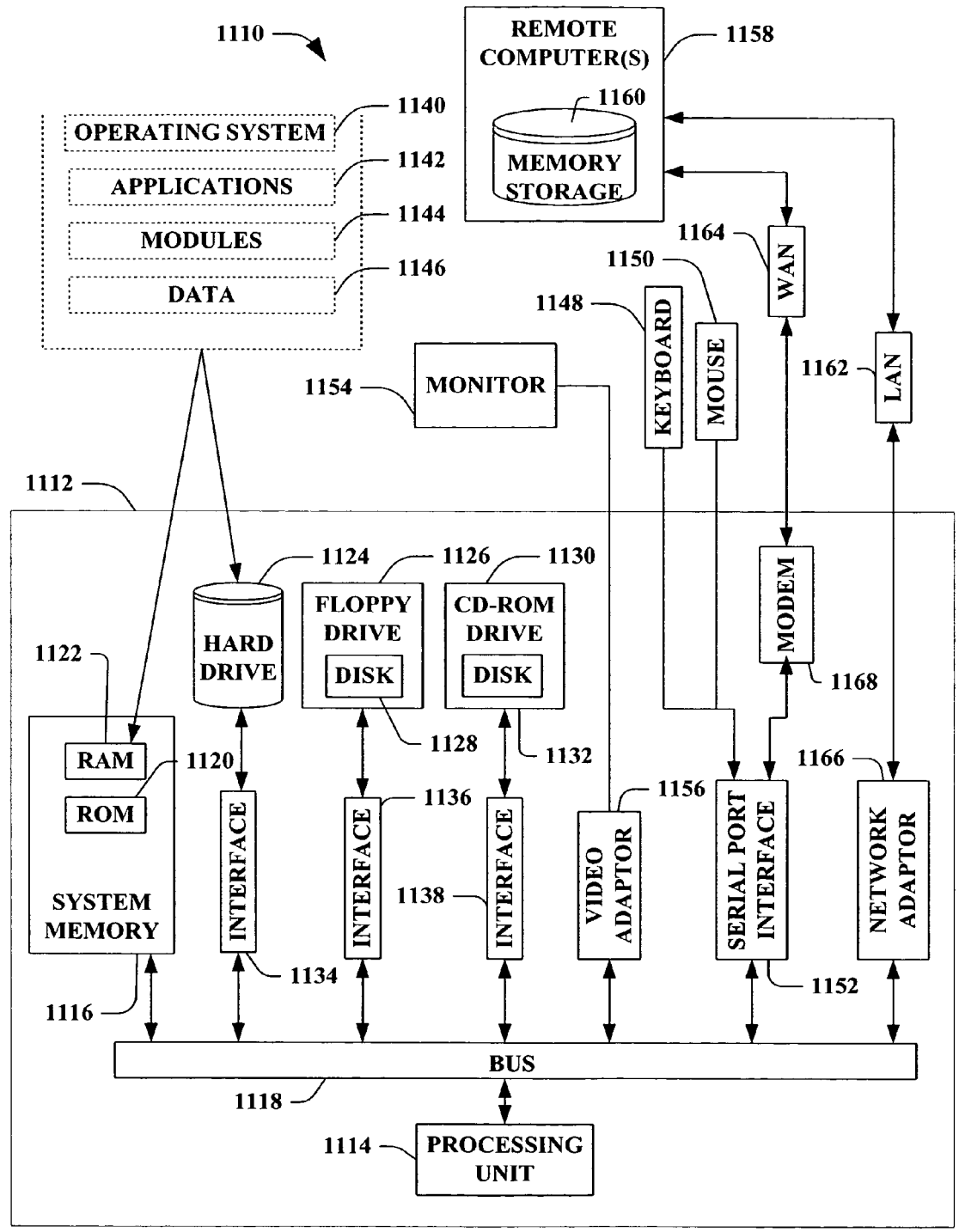
FIGS. 11 and 12 illustrate exemplary computing systems and/or environments in connection with facilitating employment of the subject invention.
Figure 12:
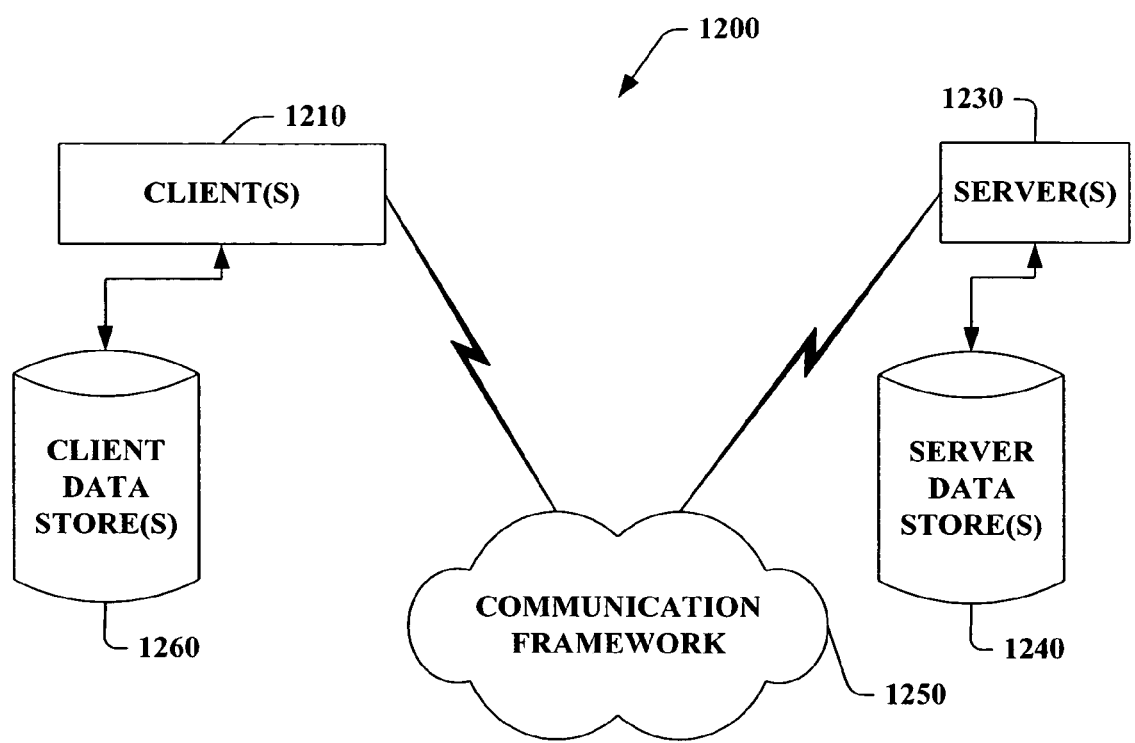

In order to provide a context for the various aspects of the invention, FIGS. 11 and 12 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules comprise routines, programs, components, data structures, etc. that perform particular tasks and/or implement particular abstract data types. Moreover, those skilled in the art will appreciate that the inventive methods can be practiced with other computer system configurations, comprising single-processor or multiprocessor computer systems, mini-computing devices, mainframe computers, as well as personal computers, hand-held computing devices, microprocessor-based or programmable consumer electronics, and the like. The illustrated aspects of the invention can also be practiced in distributed computing environments where tasks are performed by remote processing devices that are linked through a communications network. However, some, if not all, aspects of the invention can be practiced on stand-alone computers. In a distributed computing environment, program modules can be located in both local and remote memory storage devices.

With reference to FIG. 11, an exemplary environment 1110 for implementing various aspects of the invention comprises a computer 1112. The computer 1112 comprises a processing unit 1114, a system memory 1116, and a system bus 1118. The system bus 1118 couples system components comprising, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) comprising the memory bus or memory controller, a peripheral bus or external bus, and/or a local bus utilizing any variety of available bus architectures comprising, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 comprises volatile memory 1120 and nonvolatile memory 1122. The basic input/output system (BIOS), comprising the basic routines to transfer information between elements within the computer 1112, such as during start-up, is stored in nonvolatile memory 1122. By way of illustration, and not limitation, nonvolatile memory 1122 can comprise read only memory (ROM), programmable ROM (PROM), electrically programmable ROM (EPROM), electrically erasable ROM (EEPROM), or flash memory. Volatile memory 1120 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also comprises removable/non-removable, volatile/non-volatile computer storage media. FIG. 11 illustrates, for example a disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software comprises an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 comprise, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 comprise, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment utilizing logical connections to one or more remote computers, such as remote computer(s) 1144. The remote computer(s) 1144 can be a personal computer, a server, a router, a network PC, a workstation, a microprocessor based appliance, a peer device or other common network node and the like, and typically comprises many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 comprises, for exemplary purposes only, internal and external technologies such as, modems comprising regular telephone grade modems, cable modems and DSL modems, ISDN adapters, and Ethernet cards.

FIG. 12 is a schematic block diagram of a sample-computing environment 1000 with which the present invention can interact. The system 1200 comprises one or more client(s) 1210. The client(s) 1210 can be hardware and/or software (e.g., threads, processes, computing devices). The system 1200 also comprises one or more server(s) 1230. The server(s) 1230 can also be hardware and/or software (e.g., threads, processes, computing devices). The servers 1230 can house threads to perform transformations by employing the present invention, for example. One possible communication between a client 1210 and a server 1230 can be in the form of a data packet adapted to be transmitted between two or more computer processes. The system 1200 comprises a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above comprises examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system having a processor for managing central processing unit (CPU) resources in a computing device, the system comprising:
    a control component configured to analyze information associated with CPU resource allocation to determine whether a process is delinquent for utilizing a percentage of CPU resources above a predetermined threshold percentage;
    a throttling component configured to suspend a delinquent process for a variable amount of time before resuming the process to reduce the percentage of CPU resources occupied by the delinquent process; and
    a monitoring component configured to monitor the delinquent process to provide real-time feedback information regarding CPU resource usage by the delinquent process;
    wherein the throttling component is further configured to suspend and resume an object comprising the delinquent process wherein the object comprises at least one other process, a process group, and a process tree; and
    wherein the throttling component increases duration of the suspension period of the delinquent process if the delinquent process continues to occupy CPU resources above the predetermined threshold percentage after suspension and resumption of the delinquent process.

2. A system having a processor for managing central processing unit (CPU) resources in a computing device, the system comprising:
    a control component configured to analyze information associated with CPU resource allocation to determine whether a process is delinquent for utilizing a percentage of CPU resources above a predetermined threshold percentage;
    a throttling component configured to suspend a delinquent process for a variable amount of time before resuming the process to reduce the percentage of CPU resources occupied by the delinquent process; and
    a monitoring component configured to monitor the delinquent process to provide real-time feedback information regarding CPU resource usage by the delinquent process;
    wherein the throttling component is further configured to suspend and resume an object comprising the delinquent process wherein the object comprises at least one other process, a process group, and a process tree; and
    wherein the throttling component decreases duration of the suspension period of the delinquent process if the process occupies CPU resources below the predetermined threshold percentage for an sufficient number of monitoring intervals.

3. A computerized method for throttling a delinquent process that occupies more than a predetermined threshold percentage of central processing unit (CPU) resources, the method comprising:
    determining whether a process is delinquent for occupying more than a predetermined threshold percentage of CPU resources;
    monitoring the process determined to be delinquent for a fixed time period;
    suspending the delinquent process for a variable time period to initiate throttling of the delinquent process;
    resuming the delinquent process to complete throttling of the delinquent process;
    throttling an object if the object comprises the delinquent process;
    determining whether the delinquent process is still delinquent after throttling by comparing CPU resource usage after throttling to the predetermined threshold percentage; and
    adjusting the duration of the suspension period of the delinquent process if the delinquent process is still delinquent.

4. The method of claim 3, wherein the magnitude of the adjustment to the suspension period is predetermined.

5. The method of claim 3, wherein the duration of the suspension of the delinquent process is increased if the delinquent process is still delinquent.

6. The method of claim 3, wherein the duration of suspension of the delinquent process is decreased if it is determined the process is not delinquent after throttling for an sufficient period of time.

7. A computerized method for throttling a delinquent process that occupies more than a predetermined threshold percentage of central processing unit (CPU) resources, the method comprising:
    determining whether a process is delinquent for occupying more than a predetermined threshold percentage of CPU resources;
    monitoring the process determined to be delinquent for a fixed time period;
    suspending the delinquent process for a variable time period to initiate throttling of the delinquent process;
    resuming the delinquent process to complete throttling of the delinquent process;
    throttling an object if the object comprises the delinquent process;
    determining whether the delinquent process is still delinquent after throttling by comparing CPU resource usage after throttling to the predetermined threshold percentage; and
    determining whether the once delinquent process remains below the threshold CPU resource usage percentage for a predetermined time period if the once delinquent process is not delinquent after throttling.

8. The method of claim 7, further comprising ceasing monitoring of the once delinquent process if it is determined that the once delinquent process is not delinquent for a sufficient time period after throttling.

9. A computerized method for managing process utilization of central processing unit (CPU) resources comprising:
    determining whether a process is delinquent for occupying more than a predetermined percentage of CPU resources;
    monitoring the process determined to be delinquent;
    determining whether an exemption from CPU throttling exists for the delinquent process; and
    terminating monitoring of the delinquent process if the delinquent process is exempt from CPU throttling;
    wherein the method is performed on an object if the object comprises at least one delinquent process, where the object further comprises at least one other process, a process group, and a process tree; and further comprising
    running the delinquent process for a fixed time period;
    suspending the delinquent process for a variable time;
    resuming the process after the suspension period;
    determining whether the delinquent process is still delinquent after throttling by comparing the percentage of CPU resources occupied by the delinquent process after throttling to the predetermined threshold percentage;

adjusting the duration of the suspension period if the delinquent process is still delinquent after throttling; and increasing the duration of the suspension period if the delinquent process is determined to be consuming a greater percentage of CPU resources than the predetermined threshold percentage.

10. The method of claim 9, further comprising increasing the duration of the suspension period by predetermined increments.

11. The method of claim 9, further comprising making inferences regarding a most effective increment of increase to the suspension period duration.

12. The method of claim 11, wherein the inferences are based at least in part on a comparison of the percentage of CPU resources occupied by the process before and after throttling.

13. A computerized method for managing process utilization of central processing unit (CPU) resources comprising:
   determining whether a process is delinquent for occupying more than a predetermined percentage of CPU resources;
   monitoring the process determined to be delinquent;
   determining whether an exemption from CPU throttling exists for the delinquent process; and
   terminating monitoring of the delinquent process if the delinquent process is exempt from CPU throttling;
   wherein the method is performed on an object if the object comprises at least one delinquent process, where the object further comprises at least one other process, a process group, and a process tree;
   running the delinquent process for a fixed time period;
   suspending the delinquent process for a variable time;
   resuming the process after the suspension period;
   determining whether the delinquent process is still delinquent after throttling by comparing the percentage of CPU resources occupied by the delinquent process after throttling to the predetermined threshold percentage;
   adjusting the duration of the suspension period if the delinquent process is still delinquent after throttling; and
   decreasing the duration of the suspension period if the once delinquent process is determined to be consuming a lesser percentage of CPU resources than the threshold percentage for fewer than a predetermined number of monitoring intervals.

14. The method of claim 13, the suspension period duration is decreased by predetermined increments.

15. The method of claim 14, further comprising making inferences regarding a most effective increment of decrease to the suspension period duration.

16. The method of claim 15, the inferences are based at least in part on a comparison of the number of intervals for which the process consumed CPU resources is at a percentage below the predetermined threshold percentage and the predetermined threshold number of intervals.

17. A computerized method for managing process utilization of central processing unit (CPU) resources comprising:
   determining whether a process is delinquent for occupying more than a predetermined percentage of CPU resources;
   monitoring the process determined to be delinquent;
   determining whether an exemption from CPU throttling exists for the delinquent process; and
   terminating monitoring of the delinquent process if the delinquent process is exempt from CPU throttling;
   wherein the method is performed on an object if the object comprises at least one delinquent process, where the object further comprises at least one other process, a process group, and a process tree; and
   wherein the exemption of the delinquent process from CPU throttling is based at least in part on at least one of an exemption of the delinquent process itself, an exemption of a user utilizing the delinquent process, and an exemption of the object comprising the delinquent process, if the delinquent process is comprised by the object.

* * * * *